(12) United States Patent
Li et al.

(10) Patent No.: US 8,964,589 B2
(45) Date of Patent: Feb. 24, 2015

(54) METHOD AND DEVICE FOR OBTAINING CARRIER INFORMATION AND CARRIER INFORMATION INDICATION

(75) Inventors: Nan Li, Beijing (CN); Zhenping Hu, Beijing (CN); Dawei Zhang, Beijing (CN); Jin Xu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 125 days.

(21) Appl. No.: 13/704,119

(22) PCT Filed: Jun. 27, 2011

(86) PCT No.: PCT/CN2011/076374
§ 371 (c)(1),
(2), (4) Date: Dec. 13, 2012

(87) PCT Pub. No.: WO2012/000415
PCT Pub. Date: Jan. 5, 2012

(65) Prior Publication Data
US 2013/0094409 A1    Apr. 18, 2013

(30) Foreign Application Priority Data
Jun. 28, 2010 (CN) .......................... 2010 1 0220451

(51) Int. Cl.
*H04J 1/16* (2006.01)
*H04W 4/00* (2009.01)
(52) U.S. Cl.
USPC ........................... 370/252; 370/329; 370/337
(58) Field of Classification Search
USPC .................................. 370/252, 329, 337, 347
See application file for complete search history.

(56) References Cited

U.S. PATENT DOCUMENTS

| 2008/0220790 A1* | 9/2008 | Cai et al. ........................ 455/450 |
| 2009/0129330 A1 | 5/2009 | Kim et al. |
| 2010/0246456 A1* | 9/2010 | Suo et al. ...................... 370/280 |

(Continued)

FOREIGN PATENT DOCUMENTS

| CN | 101438513 A | 5/2009 |
| CN | 101772182 A | 7/2010 |

(Continued)

OTHER PUBLICATIONS

International Search Report (in Chinese with English translation) for PCT/CN2011/076374, mailed Oct. 13, 2011; ISA/CN.

*Primary Examiner* — Andrew Lee
(74) *Attorney, Agent, or Firm* — Harness, Dickey & Pierce, P.L.C.

(57) ABSTRACT

A method and device for obtaining carrier information and carrier information indication include: a user equipment obtains parameters of uplink carrier information according to the message sent by a network side in broadcast manner, or, the user equipment obtains parameters of uplink carrier information according to the preset information. Time Division Duplex wireless communication system with asymmetry uplink frequency band and downlink frequency band can be supported effectively, guard frequency band near the intersection occurred when the adjacent frequencies coexist is utilized fully, and frequency spectrum utilization rate is improved; further more, Time Division Duplex wireless communication system with unequal uplink band width and downlink band width can be supported, and the application of the Time Division Duplex system is expanded effectively.

21 Claims, 4 Drawing Sheets

(56) References Cited

U.S. PATENT DOCUMENTS

| | | | |
|---|---|---|---|
| 2010/0278084 A1* | 11/2010 | Jones et al. | 370/281 |
| 2011/0137597 A1* | 6/2011 | McIntyre et al. | 702/84 |
| 2011/0317597 A1* | 12/2011 | Wan et al. | 370/281 |
| 2013/0315211 A1* | 11/2013 | Balan et al. | 370/336 |
| 2013/0322308 A1* | 12/2013 | Yu et al. | 370/280 |
| 2014/0022961 A1* | 1/2014 | Park et al. | 370/280 |
| 2014/0064206 A1* | 3/2014 | Bao et al. | 370/329 |
| 2014/0086045 A1* | 3/2014 | Bao et al. | 370/229 |
| 2014/0086168 A1* | 3/2014 | Bao et al. | 370/329 |

FOREIGN PATENT DOCUMENTS

| | | |
|---|---|---|
| CN | 101808402 A | 8/2010 |
| CN | 101868028 A | 10/2010 |
| CN | 101969697 A | 2/2011 |
| WO | WO-2010/032812 A1 | 3/2010 |

* cited by examiner

METHOD AND DEVICE FOR OBTAINING CARRIER INFORMATION AND CARRIER INFORMATION INDICATION

CROSS-REFERENCE TO RELATED APPLICATIONS

This application is a 371 U.S. National Stage of International Application No. PCT/CN2011/076374, filed on Jun. 27, 2011, which claims the priority of Chinese Patent Application No. 201010220451.8, entitled "METHOD AND EQUIPMENT FOR OBTAINING CARRIER INFORMATION AND IDENTIFIER OF CARRIER INFORMATION IN TIME DIVISION DUPLEXING SYSTEM", filed with the Chinese Patent Office on Jun. 28, 2010. The contents of the above applications are incorporated by reference herein in their entirety.

FIELD OF THE INVENTION

The present invention relates to the field of communication technology, and in particular to a method and equipment for obtaining carrier information and an identifier of carrier information.

BACKGROUND OF THE INVENTION

The Time Division Duplex (TDD) technique is one of the duplex techniques used in a mobile communication system, which corresponds to the Frequency Division Duplex (FDD) technique.

In a communication system of TDD-mode, the uplink and downlink communications between a base station and a mobile station use different time slots in the same frequency band. The uplink and downlink communications use the same frequency band, and have the same bandwidths by separating the receiving channel from the sending channel by the time. The resources for the uplink or downlink communication are not continuous in time domain, and the time resources are distributed to both the uplink and downlink communications.

For FDD, the uplink and downlink communications are respectively performed in two separate symmetrical frequency channels, and a guard band is used to separate the uplink and downlink channels. Frequencies in pair must be used in FDD, the uplink and the downlink are distinguished by the frequency, and the resources for the uplink or downlink communication are continuous in time domain.

However, during the implementation of the present invention, the inventor discovered that there are at least the following problems in the prior art.

In a TDD system, the uplink and downlink transmissions occupy all the bands. The interference between the uplink and the down link within the working band or at the edge of the working band can not be avoided when the TDD system is configured to work with the other mobile communication systems. If the band isolation is implemented by reserving the guide band, the spectrum resource is wasted greatly.

SUMMARY OF THE INVENTION

It is provided a method and equipment for obtaining carrier information and an identifier of carrier information according to the invention, so as to make operators effectively utilize a guard band near an intersection occurred when TDD and FDD coexist in adjacent frequency band in a wireless system, thus improving spectrum utilization ratio.

To achieve the above object, it is provided a method for obtaining carrier information by user equipment according to an embodiment of the invention, which is used to time division duplex wireless communication system in which the band of the uplink is asymmetrical with that of the downlink, the method including the following steps:

obtaining, by the user equipment, a parameter of uplink carrier information according to a message issued by a network side in broadcast manner; or obtaining, by the user equipment, the parameter of uplink carrier information according to preset information.

It is provided a method for indicating carrier information according to an embodiment of the invention, which is used to a time division duplex wireless communication system in which the band of the uplink is asymmetrical with that of the downlink, the method including the following steps:

issuing, by a network-side equipment, a parameter of uplink carrier information to a user equipment in broadcast manner; or issuing, by a network-side equipment, an identifier of uplink carrier information to the user equipment in broadcast manner.

It is provided a user equipment according to an embodiment of the invention, which is used to a time division duplex wireless communication system in which the band of the uplink is asymmetrical with that of the downlink, the user equipment including:

an obtaining module adapted to obtain a parameter of uplink carrier information according to a message issued by a network side in broadcast manner or obtain a parameter of uplink carrier information according to preset information.

It is provided a network-side equipment according to an embodiment of the invention, which is used to a time division duplex wireless communication system in which the band of the uplink is asymmetrical with that of the downlink, the network-side equipment including:

a sending module adapted to issue a parameter of uplink carrier information to a user equipment in broadcast manner or issue an identifier of uplink carrier information to a user equipment in broadcast manner.

As compared with the prior art, the embodiments of the invention have at least the following advantages.

The solution according to the present invention can effectively support Time division duplex wireless communication system in which the band of the uplink is asymmetrical with that of the downlink, the guard band near the intersection occurred when FDD and TDD coexist in adjacent frequency band in the wireless system is utilized fully, and thus the spectrum utilization ratio is improved. Further, the invention can support the time division duplex wireless communication system is which the bandwidth of the uplink carrier is unequal to that of the downlink carrier, and the application of the time division duplex system is expanded effectively.

BRIEF DESCRIPTION OF THE DRAWINGS

In order to illustrate the technical solutions according to the embodiments of the invention or in the prior art more clearly, drawings to be used in the description of the prior art or the embodiments will be described briefly hereinafter. Apparently, the drawings described hereinafter are only some embodiments of the present invention, and other drawings may be obtained by those skilled in the art according to those drawings without inventive efforts.

DETAILED DESCRIPTION OF THE INVENTION

In the existing time division duplex mobile communication system, the band occupied by the uplink slots is totally the same as that occupied by the down slots. To avoid the interference, in the prior art, it is necessary to perform band isolation by reserving a guard band. During the layout of the frequency, some band intervals are generally reserved between different wireless businesses, and the reserved band intervals can be used as the guard band which can not be used for the communication. As well known, since the frequency resources are limited and non-renewable, the frequency resource is wasted in the existing method in which the guard band is used.

To overcome the above problems and improve the utilization ratio of the spectrum resource, the asymmetric time division duplex wireless communication system based on the frequency offset can be adopted, so as to utilize the guard band occurred when FDD and TDD coexist. The term "asymmetric" refers to the asymmetry between the uplink band and the downlink band. The so-called symmetric uplink and downlink bands refer that the bandwidth of the uplink is the same as that of the downlink and the center of the uplink is coincidence with that of the downlink. Except for the symmetry, the uplink and downlink bands are asymmetric. For example, the uplink and downlink bands have equal bandwidths, the center of the uplink band is not coincidence with the center of the downlink band; or the uplink and downlink bands have unequal bandwidths, and the center of the uplink band is not coincidence with the center of the downlink band; or the uplink and downlink bands have unequal bandwidths, the center of the uplink band is coincidence with the center of the downlink band; or carriers composing the uplink band are not continuous, and/or the carriers composing the downlink band are not continuous; or the uplink and downlink bands have no an overlap portion, or the like. In the time division duplex mode, the uplink and downlink bands are configured as asymmetric, so that the uplink and downlink transmission will not occupy all the bands, thus facilitating the decreased uplink and downlink interference within the working band or at the edge of the working band when the system is configured to work with other mobile communication system.

Figure 1:
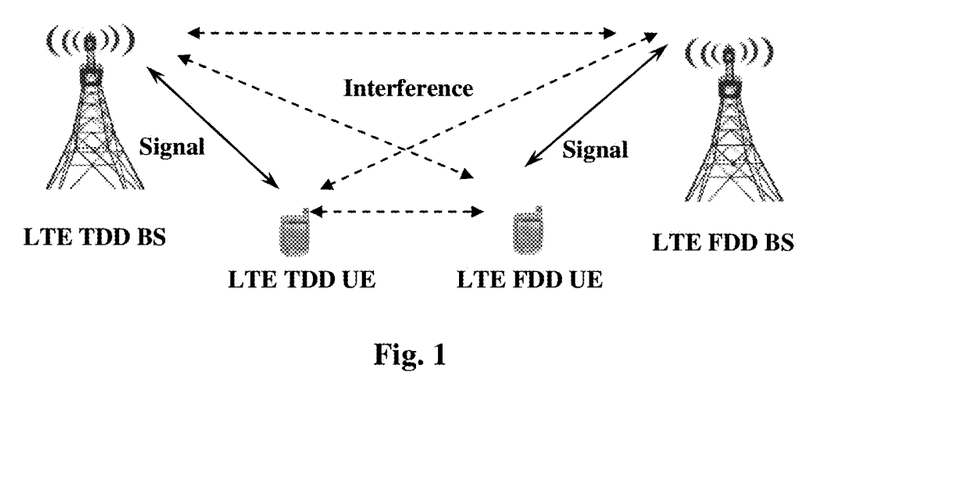
FIG. 1 is a schematic diagram of a time division duplex wireless communication system in which the band of the uplink is asymmetrical with that of the downlink.

In FIG. 1, a schematic diagram of a time division duplex (TDD) wireless communication system in which the band of the uplink is asymmetrical with that of the downlink is shown. This system includes a Long Term Evolution (LTE) TDD based BS (Base Station), a TDD based UE (User Equipment), a LTE FDD based BS, and an LTE FDD based UE.

Figure 2:
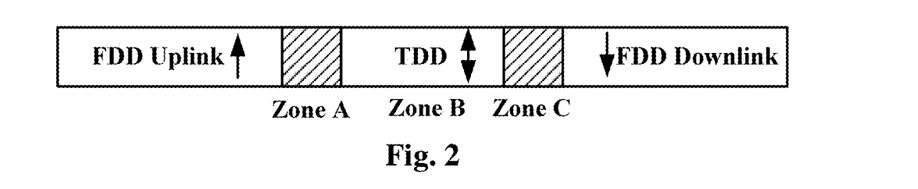
FIG. 2 is a schematic diagram of a structure of a TDD system time of Zone A.
Figure 3:
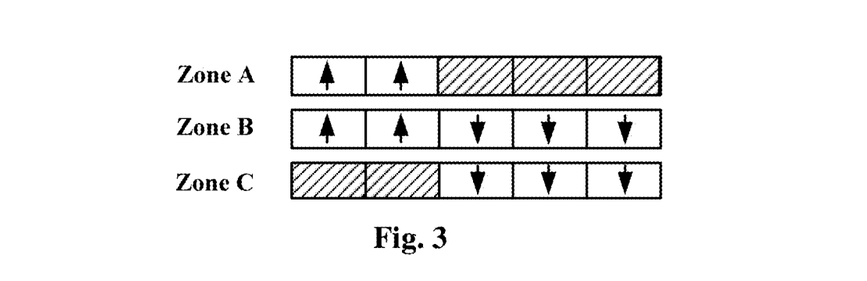
FIG. 3 is a schematic diagram of performing a transmission in guard bands of Zone A and Zone C.

In the time division duplex wireless communication system in which the band of the uplink is asymmetrical with that of the downlink, assumed that the structure of the TDD system time (for example, a time slot distribution of the uplink and downlink, a sign distribution of the uplink and downlink) is as shown in FIG. 2. Zone A and Zone C are the guard bands, Zone B is the band occupied by TDD. The guard band of the Zone A is only permitted to perform the uplink transmission to avoid the interference of the adjacent FDD Uplink, and the guard band of the Zone C is only permitted to perform the downlink transmission to avoid the interference of the adjacent FDD downlink. The uplink and downlink transmissions of individual time slot resource in Zone A, Zone B and Zone C are shown in FIG. 3. In this case, it can be seen that for Zone A and Zone C, the downlink will not be interfered by the uplink of the adjacent-frequency system.

In the time division duplex wireless communication system in which the band of the uplink is asymmetrical with that of the downlink, the bandwidths of the Zone A and Zone C can be the same or different. However, if it is necessary to use the spectrums in the Zone A and Zone C in pairs, the spectrums in the Zone A and Zone B in pairs, or the spectrums in the Zone B and Zone C in pairs, it can not be supported by the existing method for configuring system information.

In the existing method for configuring system information, the dl-bandwidth (downlink bandwidth) parameter is defined in the Master Information Block (MIB), the ul-CarrierFreq (a center frequency of the uplink carrier) parameter and the ul-bandwidth (uplink bandwidth) parameter are defined in the System Information Blocks (SIB2). For FDD, if there is no special indication, the duplex spacing defined in TS36.101 will be adopted; and for TDD, the ul-CarrierFreq can not be configured and is defined as equal to the dl-CarrierFreq, and the dl-bandwidth also can not be configured and is defined as equal to the ul-bandwidth.

For TDD, when the terminal detects a center frequency of the downlink carrier dl-CarrierFreq, it will be considered that the center frequency of the uplink carrier ul-CarrierFreq is equal to the dl-CarrierFreq, the default is to send the uplink data at the dl-CarrierFreq. When the dl-bandwidth is received, it will be considered that ul-bandwidth is equal to the dl-bandwidth, the configuration in which the center frequency of the uplink carrier is unequal to the center frequency of the downlink carrier or the bandwidth of uplink carrier is unequal to the bandwidth of downlink carrier can not be supported, i.e., the work of the special TDD system utilizing the guard band can not be supported. Further, in the research for carrier aggregation, in the scene of the continuous carrier aggregation in one band in the presently defined time division duplex (TDD) system, the maximum bandwidth of the downlink carrier is 50 MHz, the maximum bandwidth of the uplink carrier is 40 MHz, and the case in which the bandwidth of the uplink carrier is unequal to that of the downlink carrier will occur. In the case of TDD, the existing broadcast message does not support the case that the bandwidth of the uplink carrier is configured to be unequal to that of the downlink carrier, that is, can not support the above application.

Summarily, the broadcast message issued by the network side in the prior art does not support the configuration in which the center frequency of the uplink carrier center frequencies is different from that of the downlink carrier and the configuration in which the bandwidth of the uplink carrier is different from that of the downlink carrier, that is, can not support the work of the special TDD system utilizing the guard band described above.

Because the existing method for obtaining position information and/or bandwidth information of the uplink carrier frequency by user equipment can not support the time division duplex wireless communication system in which the center frequency of the uplink carrier is different from that of the downlink carrier or the bandwidth of the uplink carrier is unequal to that of the downlink carrier, it is provided a method and device for obtaining carrier information and an identifier of carrier information in a time division duplex system according to an embodiment of the invention, for supporting the work of the above time division duplex wireless communication system. The time division duplex wireless communication system in which the band of the uplink is asymmetrical with that of the downlink is effectively supported. In addition, the time division duplex wireless communication system in which the bandwidth of the uplink carrier is unequal to that of the downlink carrier is also supported.

Hereinafter, the technical solutions in the embodiments of the present invention are described clearly and completely in conjunction with the drawings in the embodiments of the present invention. Apparently, the described are only a part but not all of the embodiments of the present invention. Other embodiments obtained by those skilled in the art based on the embodiments in the present invention without creative effort will fall within the scope of protection of the present invention.

First Embodiment

Figure 4:
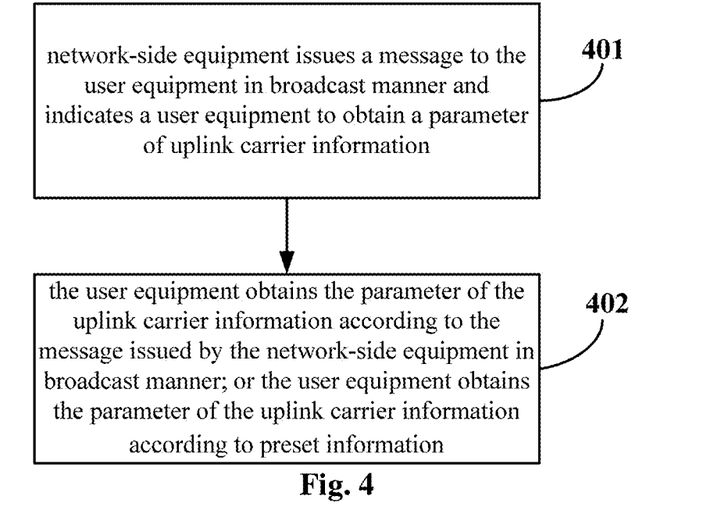
FIG. 4 is a flowchart of a method for obtaining carrier information and an identifier of carrier information according to a first embodiment of the invention.

As shown in FIG. 4, it is provided a method for obtaining carrier information and an identifier of carrier information according to a first embodiment of the invention, which is used to a time division duplex wireless communication system in which the band of the uplink is asymmetrical with that of the downlink. The method includes the following steps.

Step 401, issuing, by a network-side equipment, a parameter of uplink carrier information to a user equipment in broadcast manner; or issuing, by a network-side equipment, an identifier of uplink carrier information to a user equipment in broadcast manner.

The uplink carrier information includes but not limited to an uplink carrier frequency and/or an uplink carrier bandwidth; the parameter of uplink carrier information include but not limited to: a position parameter of the uplink carrier frequency and/or a bandwidth parameter of an uplink carrier frequency which are configurable; and the positions of the uplink and downlink carrier frequency can be identical or not identical, the uplink and downlink carrier bandwidths can be equal or unequal.

In this step, the network-side equipment can issues the parameter of the uplink carrier information to the user equipment by a broadcast message, or issues the identifier of the uplink carrier information to the user equipment by a broadcast message.

The network-side equipment can also carry neither the parameter of the uplink carrier information nor the identifier of the uplink carrier information in the broadcast message, the user equipment can obtain the parameter of uplink carrier information directly from the preset information when receiving the broadcast message without the parameter or the identifier.

Step 402, obtaining, by the user equipment, the parameter of the uplink carrier information according to a message issued by a network side in broadcast manner; or obtaining, by the user equipment, the parameter of the uplink carrier information according to preset information.

Specifically, when the message issued by the network side in broadcast manner (i.e., the broadcast message) is received, (1) if the parameter of the uplink carrier information are carried in the message, the user equipment obtains the parameter of the uplink carrier information carried in the message issued by the network side in broadcast manner. (2) If the identifier of the uplink carrier information is carried in the message, the user equipment obtains the parameter of the uplink carrier information from preset information according to the identifier of uplink carrier information, in which the identifier of the uplink carrier information corresponds to the parameter of uplink carrier information. (3) If neither the parameter of the uplink carrier information nor the identifier of the uplink carrier information is carried in the message, the parameter of the uplink carrier information is directly obtained from the preset information, in which the preset information includes a position information for determining the uplink carrier frequency and/or a bandwidth information for determining the uplink carrier bandwidth. The preset information is directly set on the user equipment, or issued to the user equipment by the network side and stored on the user equipment.

If the identifier of the uplink carrier information is an identifier of the uplink carrier frequency, the identifier of the uplink carrier frequency indicates whether the center frequency of the uplink carrier is identical with that of the downlink carrier; and if the identifier of the uplink carrier information is the identifier of the uplink carrier bandwidth, the identifier of the uplink carrier bandwidth indicates whether the uplink carrier bandwidth is identical with the downlink carrier bandwidth.

In the embodiment of the invention, the position parameter of the uplink carrier frequency includes but not limited to: a center frequency of the uplink carrier frequency, starting position and ending position of the uplink carrier frequency, or spacing information between the position of the uplink carrier frequency and the position of the downlink carrier frequency. The spacing information between the position of the uplink carrier frequency and the position of the downlink carrier frequency includes but not limited to: a spacing between an edge of the uplink carrier bandwidth and an edge of the downlink carrier bandwidth, a spacing between the center frequency of the uplink carrier bandwidth and the center frequency of the downlink carrier bandwidth, a spacing between a start frequency of the uplink carrier bandwidth and a start frequency of the downlink carrier bandwidth, or a spacing between a end frequency of the uplink carrier bandwidth and a end frequency of the downlink carrier bandwidth.

The bandwidth parameter of the uplink carrier frequency includes but not limited to: a size of the uplink bandwidth.

It is to be noted that the technical solution according to the embodiment of the invention is applicable to the time division duplex wireless communication system with asymmetric uplink and downlink bands. The band corresponding to the uplink carrier frequency is one of the intersection bands occurred when FDD and TDD coexist in adjacent frequency band in the wireless communication system, and the band corresponding to the downlink carrier frequency is another one of the intersection bands occurred when FDD and TDD coexist in adjacent frequency band in the wireless communication system; the band corresponding to the uplink carrier frequency is one of the intersection bands occurred when FDD and TDD coexist in adjacent frequency band in the wireless communication system, and the band corresponding to the downlink carrier frequency is one of the downlink bands of the wireless communication system; the band corresponding to the uplink carrier frequency is one of the uplink bands of the wireless communication system, and the band corresponding to the downlink carrier frequency is another one of the intersection bands occurred when FDD and TDD coexist in adjacent frequency band in the wireless communication system; the band corresponding to the uplink carrier frequency is one of the intersection bands occurred when FDD and TDD coexist in adjacent frequency band in the wireless communication system, the band corresponding to the downlink carrier frequency is one of the intersection bands occurred when FDD and TDD coexist in adjacent frequency band in the wireless communication system and one of the uplink bands of the wireless communication system; the band corresponding to the uplink carrier frequency is one of the intersection bands occurred when FDD and TDD coexist in adjacent frequency band in the wireless communication system and one of the uplink bands of the wireless communication system, the band corresponding to the downlink carrier frequency is one of the intersection bands occurred when FDD and TDD coexist in adjacent frequency band in the wireless communication system; or the band corresponding to the uplink carrier frequency is one of the intersection bands occurred when FDD and TDD coexist in adjacent frequency band in the wireless communication system and one of the uplink bands of the wireless communication system, the band corresponding to the downlink carrier frequency is one of the intersection bands occurred when FDD and TDD coexist in adjacent frequency band in the wireless communication system and one of the uplink bands of the wireless communication system.

It can be seen that in the technical solution according to the embodiment of the invention, the position parameter and/or bandwidth parameter of the uplink carrier frequency position parameters are obtained and the position and/or bandwidth of the uplink carrier frequency is determined according to the above parameters, so as to make the operator effectively utilize a guard band near an intersection occurred when FDD and TDD coexist in adjacent frequency band in a wireless system and improve spectrum utilization ratio. The time division duplex wireless communication with asymmetric uplink and down bands can be supported effectively. Further, the time division duplex wireless communication system in which the uplink carrier bandwidth is unequal to the downlink carrier bandwidth can be supported.

Second Embodiment

To describe the technical solution according to the embodiment of the invention more clearly, the method for obtaining carrier information and an identifier of carrier information in this time division duplex system will be described in detail in connection with the second embodiment of the invention. The uplink carrier information includes but not limited to an uplink carrier frequency and/or an uplink carrier bandwidth. In the embodiment of the invention, a position parameter and/or bandwidth parameter of the uplink carrier frequency uplink carrier frequency can be defined in the broadcast information or specification. The position parameter of the uplink carrier frequency is used to indicate the position of the uplink carrier frequency, and the bandwidth parameter of the uplink carrier frequency is used to indicate the bandwidth of the uplink carrier. It is to be noted that the position parameter and/or bandwidth parameter of the uplink carrier frequency in the broadcast information are configurable.

Figure 5:
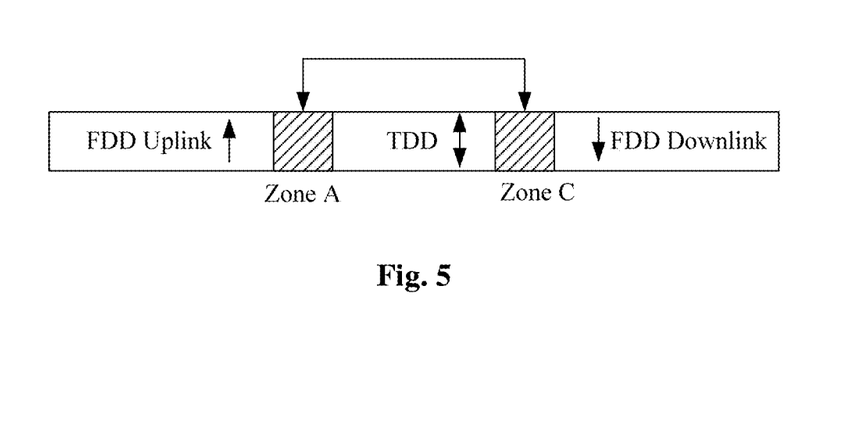
FIG. 5 is a schematic diagram of a structure in which a TDD system coexists with a FDD system defined in an embodiment of the invention.

In the time division duplex wireless communication system in which the band of the uplink is asymmetrical with that of the downlink, taking FIGS. 2 and 5 as an example for description again, the uplink and downlink bands can respectively correspond to Zone A and Zone C; Zone A and Zone B; Zone B and Zone C; or Zone A, Zone B and Zone C, where the sizes and positions of Zone A, Zone B and Zone C can be configured according to the requirement of the coexistence.

Specifically, the band corresponding to the uplink carrier frequency is one (for example, Zone A) of the intersection bands occurred when FDD and TDD coexist in adjacent frequency band in the wireless communication system, and the band corresponding to the downlink carrier frequency is another one (for example, Zone C) of the intersection bands occurred when FDD and TDD coexist in adjacent frequency band in the wireless communication system. Alternatively, the band corresponding to the uplink carrier frequency is one (for example, Zone A) of the intersection bands occurred when FDD and TDD coexist in adjacent frequency band in the wireless communication system, and the band corresponding to the downlink carrier frequency is one (for example, the band for downlink transmission in Zone B) of the downlink bands of the wireless communication system. Alternatively, the band corresponding to the uplink carrier frequency is one (for example, the band for uplink transmission in Zone B) of the uplink bands of the wireless communication system, and the band corresponding to the downlink carrier frequency is another one (for example, Zone C) of the intersection bands occurred when FDD and TDD coexist in adjacent frequency band in the wireless communication system. Alternatively, the band corresponding to the uplink carrier frequency is one (for example, Zone A) of the intersection bands occurred when FDD and TDD coexist in adjacent frequency band in the wireless communication system, the band corresponding to the downlink carrier frequency is one (for example, Zone C) of the intersection bands occurred when FDD and TDD coexist in adjacent frequency band in the wireless communication system and one (for example, the band for uplink transmission in Zone B) of the uplink bands of the wireless communication system. Alternatively, the band corresponding to the uplink carrier frequency is one (for example, Zone A) of the intersection bands occurred when FDD and TDD coexist in adjacent frequency band in the wireless communication system and one (for example, the band for uplink transmission in Zone B) of the uplink bands of the wireless communication system, the band corresponding to the downlink carrier frequency is one (for example, Zone C) of the intersection bands occurred when FDD and TDD coexist in adjacent frequency band in the wireless communication system. Alternatively, the band corresponding to the uplink carrier frequency is one (for example, Zone A) of the intersection bands occurred when FDD and TDD coexist in adjacent frequency band in the wireless communication system and one (for example, the band for uplink transmission in Zone B) of the uplink bands of the wireless communication system, the band corresponding to the downlink carrier frequency is one (for example, Zone C) of the intersection bands occurred when FDD and TDD coexist in adjacent frequency band in the wireless communication system and one (for example, the band for uplink transmission in Zone B) of the uplink bands of the wireless communication system.

In this time division duplex wireless communication system in which the band of the uplink is asymmetrical with that of the downlink, the position parameter of the uplink carrier frequency includes but not limited to: a center frequency of the uplink carrier frequency, starting position and ending position of the uplink carrier frequency, or spacing information between the position of the uplink carrier frequency and the position of the downlink carrier frequency. The spacing information between the position of the uplink carrier frequency and the position of the downlink carrier frequency includes: a spacing between a bandwidth edge of the uplink carrier and a bandwidth edge of the downlink carrier, a spacing between a center frequency of the uplink carrier bandwidth and a center frequency of the downlink carrier bandwidth, a spacing between a start frequency of the uplink carrier bandwidth and a start frequency of the downlink carrier bandwidth, or a spacing between a end frequency of the uplink carrier bandwidth and a end frequency of the downlink carrier bandwidth.

In the time division duplex wireless communication system in which the band of the uplink is asymmetrical with that of the downlink, the bandwidth parameter of the uplink carrier frequency includes: a size of the uplink bandwidth.

In the embodiment of the invention, to determine the position of the uplink carrier frequency, the position parameter of the uplink carrier frequency is defined by the following manners which include but not limited to:

(1) The Position Parameter Defined in the Specification Directly

If the system, for example, the time division duplex wireless communication system in which the band of the uplink is asymmetrical with that of the downlink, can be accepted in one region and the positions of the uplink and downlink frequencies can be fixed, the information, such as the position of the uplink carrier frequency (such as the position of the carrier center frequency or the position of the carrier starting frequency) and the position of the downlink carrier frequency (such as the position of the carrier center frequency or the position of the carrier starting frequency), or the spacing between the uplink carrier frequency and the center frequencies of the downlink carrier can be directly defined into the specification, and the position of the uplink carrier frequency can be determined according to the above information.

(2) Center Frequency of Uplink Carrier

By defining the center frequency of the uplink carrier, the frequency position of the uplink carrier can be determined. For example, the center frequency of the uplink carrier can be indicated by E-UTRA Absolute Radio Frequency Channel Number (EARFCN).

For example, in the TDD system with an uplink carrier bandwidth of 20 MHz, the frequency ranging from 2570 MHz to 2590 MHz, and center frequency of 2580 MHz, the center frequency of the uplink carrier is directly defined as 2580 MHz, the bandwidth is directly defined as 20 MHZ, and the frequency position and bandwidth of the uplink carrier can be determined.

The position parameter of the uplink carrier frequency can be UL_CarrierFreq, which is configurable. UL-CarrierFreq can be equal to or unequal to the center frequency of the downlink carrier DL-CarrierFreq.

Figure 6:
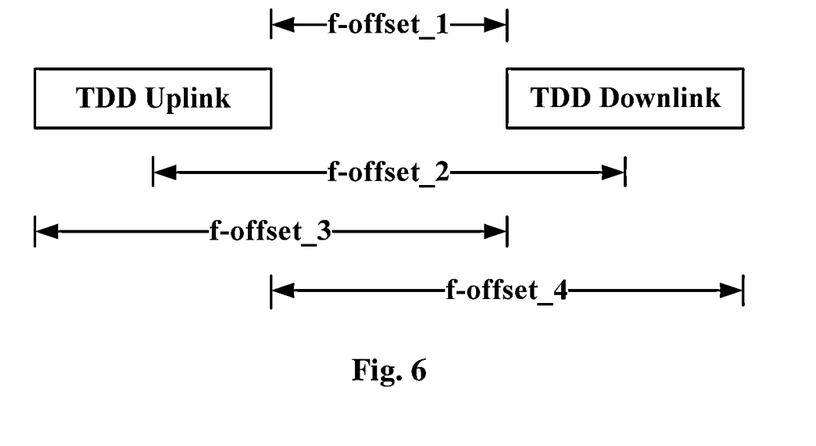
FIG. 6 is a schematic diagram of spacing information between a position of an uplink carrier frequency and a position of a downlink carrier frequency defined in an embodiment of the invention.

(3) Spacing Information (F-Offset) Between the Position of the Uplink Carrier Frequency and the Position of the Downlink Carrier Frequency As shown in FIG. 6, the spacing information is selectively defined by the following manners which includes but not limited to: the spacing f-offset_1 between the bandwidth edge of the uplink carrier (TDD Uplink) and the bandwidth edge of the downlink carrier (TDD Downlink); the spacing f-offset_2 between the center frequency of the uplink carrier bandwidth and the center frequency of the downlink carrier bandwidth; the spacing f-offset_3 between the start frequency of the uplink carrier bandwidth and the start frequency of the downlink carrier bandwidth; and the spacing f-offset_4 between the end frequency of the uplink carrier bandwidth and the end frequency of the downlink carrier bandwidth.

It is to be noted that in the embodiment of the invention, the quantification manner of the frequency spacing f_offset can be the LTE based channel raster quantification. For example, LTE channel raster is 100 KHz, and an available quantification of the frequency spacing is the integral times of the channel raster. For example, the spacing is 50 MHz, and the quantification can be described as 500.

Generally, the position of the uplink frequency is relatively low, and the position of the downlink frequency is relatively high, and f_offset is negative. However in practice, there is possible that the position of the downlink frequency is relatively low and the position of the uplink frequency is relatively high, and f_offset is positive. Thus, whether the frequency offset is positive or negative can be indicated by one bit, and the size of the frequency offset can be indicated by other bits. Other manner for indicating whether the frequency offset is positive or negative is available.

Further, in the embodiment of the invention, the quantification can be performed in other units, for example, in 1 MHz, which can save bit cost. It can be seen that in practice, the frequency spacing of a pair of the uplink and downlink ranges from tens of MHz to 100 MHz, which can generally be indicated by only 9 bits to 10 bits.

Figure 7:
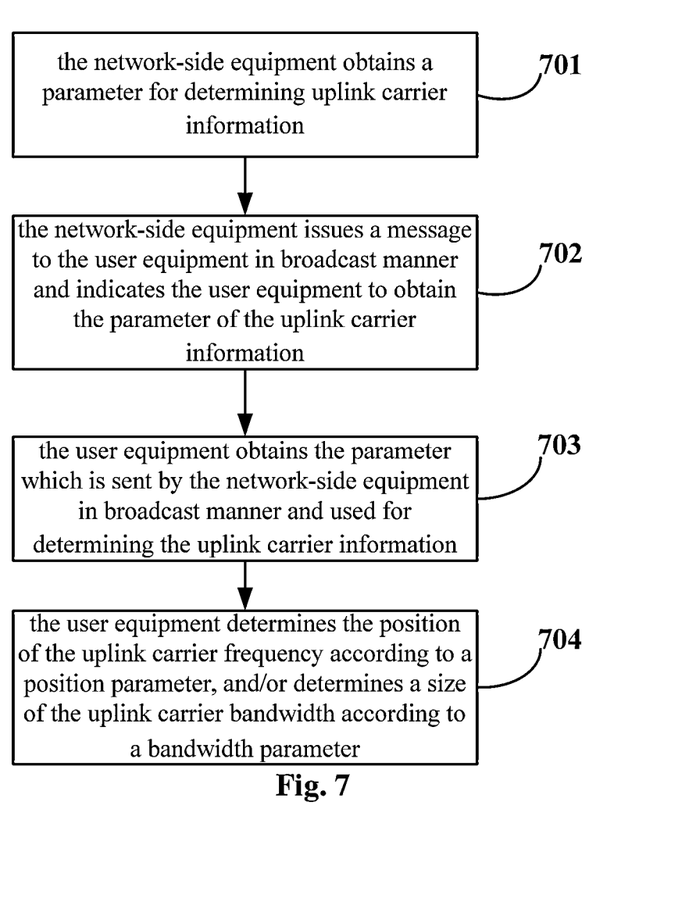
FIG. 7 is a flowchart of a method for obtaining carrier information and an identifier of carrier information according to a second embodiment of the invention.

Based on this, as shown in FIG. 7, the method for obtaining carrier information and an identifier of carrier information according to the embodiment of the invention includes the following steps.

Step 701, obtaining, by the network-side equipment, a parameter for determining the uplink carrier information. The uplink carrier information includes uplink carrier frequency and/or uplink carrier bandwidth; the parameter of uplink carrier information includes: a position parameter of the uplink carrier frequency and/or a bandwidth parameter of the uplink carrier frequency. In the embodiment of the invention, the position parameter of the uplink carrier frequency is taken as an example for the description.

For example, the network-side equipment can obtain the center frequency of the uplink carrier; or the network-side equipment can obtain the spacing information between the position of the uplink carrier frequency and the position of the downlink carrier frequency (for example, the spacing between an edge of the uplink carrier bandwidth and an edge of the downlink carrier bandwidth) and the like.

Step 702, issuing, by the network-side equipment, a parameter for determining the uplink carrier information to a user equipment in broadcast manner; or issuing, by the network-side equipment, an identifier of uplink carrier information to the user equipment in broadcast manner.

Specifically, if the network-side equipment determines that it is necessary to notify the user equipment of the position parameter and/or bandwidth parameter of the uplink carrier frequency, the network-side equipment can send the position parameter and/or bandwidth parameter of the uplink carrier frequency to the user equipment in broadcast manner (such as broadcast message), i.e., the position parameter of the uplink carrier frequency (the center frequency of the uplink carrier frequency, the starting and ending positions of the uplink carrier frequency, or the spacing information between the position of the uplink carrier frequency and the position of the downlink carrier frequency) and/or the bandwidth parameter of the uplink carrier frequency (the size of the uplink bandwidth) are carried in the broadcast message.

It is to be noted that if the uplink carrier information has been written into the specification and the related information for determining the uplink carrier frequency (for example, determining the position of the uplink carrier frequency) has been stored in the user equipment, the network side can send the identifier of the uplink carrier information to the user equipment in broadcast manner (for example, broadcast message). The identifier of uplink carrier information can be an identifier of the uplink carrier frequency or an identifier of the uplink carrier bandwidth. In the case of the identifier of the uplink carrier frequency, the identifier of the uplink carrier frequency indicates whether the center frequency of the uplink carrier is equal to that of the downlink carrier; and in the case of the identifier of the uplink carrier bandwidth, the identifier of the uplink carrier bandwidth indicates whether the bandwidth of the uplink carrier is equal to that of the downlink carrier. Further, if the uplink carrier information has been written into the specification and the related information for determining uplink carrier frequency (for example, determining the position of the uplink carrier frequency) has been stored in the user equipment, the network side can send no information to the user equipment, and the user equipment sets the uplink carrier frequency and/or the uplink carrier bandwidth according to the stored related information for determining uplink carrier frequency.

Step 703, obtaining, by the user equipment, the information sent by the network side in broadcast manner so as to determine the parameter of the uplink carrier information; or obtaining, by the user equipment, a preset parameter for determining the uplink carrier information.

In the embodiment of the invention, when the broadcast message is received from the network side, if the position parameter of the uplink carrier frequency (the center frequency of the uplink carrier frequency, the starting and ending positions of the uplink carrier frequency, or the spacing information between the uplink carrier frequency position and the downlink carrier frequency position) and/or the bandwidth parameter of the uplink carrier frequency (the size of the uplink bandwidth) are carried in the broadcast message, the user equipment can obtain the parameter for determining the uplink carrier information directly according to the broadcast message.

Further, if the parameters of uplink carrier information have been written into the specification and the related information for determining the uplink carrier frequency has been stored in the user equipment, because the user equipment has stored the related information for determining the uplink carrier frequency, the user equipment can obtain the preset parameter for determining the uplink carrier information according to the information stored by itself, even if the parameter of uplink carrier information is not carried in the broadcast message.

Specifically, when the network side issues the identifier of the uplink carrier information (for example, an identifier of the uplink carrier frequency or an identifier of the downlink carrier frequency) to the user equipment in broadcast manner, according to the identifier of the uplink carrier information, the user equipment determine that the preset parameter for determining the uplink carrier information is obtained according to the information stored by itself. In addition, in practical application, the user equipment can obtain the preset parameter for determining the uplink carrier information according to the information stored by itself, even if the parameter or identifier of the uplink carrier information is not carried in the broadcast message received from the network side.

It is to be noted that in this step, before obtaining the preset parameter for determining the uplink carrier information, the user equipment needs to store the parameter for determining the uplink carrier information. The method for storing the parameter includes but not limited to: storing directly the related information defined in the specification (for example, the position of the uplink carrier frequency, the size of the uplink carrier frequency bandwidth, and the like); receiving the parameter for determining the uplink carrier information that is issued by the network side in broadcast manner, and storing the parameter.

Step 704, determining, by the user equipment, the position of the uplink carrier frequency according to the position parameter of the uplink carrier frequency, and/or determining, by the user equipment, the size of the uplink carrier bandwidth according to the bandwidth parameter for the uplink carrier frequency.

In the embodiment of the invention, when the position of the uplink carrier frequency is determined, the determined position can be a specific position point or a range, which will not be described any more in detail in the embodiment of the invention.

Third Embodiment

Figure 8:
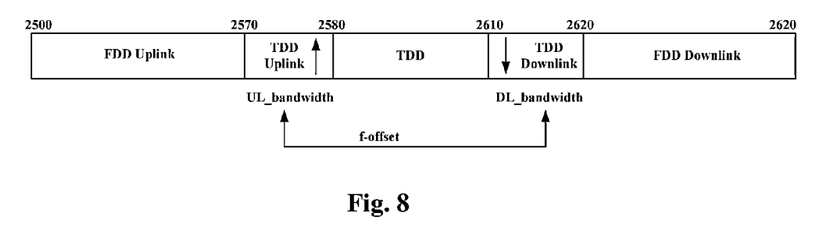
FIG. 8 is a schematic diagram of a time division duplex wireless communication system in which the band of the uplink is asymmetrical with that of the downlink according to a third embodiment of the invention.

As shown in FIG. 8, in the time division duplex wireless communication system in which the band of the uplink is asymmetrical with that of the downlink, the working frequency of FDD is 2500-2570/2620-2690 MHz, the working frequency of TDD is 2570-2620 MHz, and the 2570-2580/2610-2620 MHz can be used for the asymmetric time division duplex in pairs.

In the MIB or SIB in the broadcast information (the broadcast information is only one carrying manner in the invention, other message issued in broadcast manner is available), a new parameter f_offset is defined for indicating that the spacing between the center frequencies of the uplink carrier and the downlink carrier is 40 MHz, which is represented as −400.

Once reading the downlink and uplink bandwidths in the broadcast information, the UE reads the spacing between the center frequencies of the uplink carrier and the downlink carrier in the broadcast information: f_offset=−400, and the center frequency UL_CarrierFreq (37799) of the uplink carrier can be determined as 2575 MHz according to the EARFCN (numbered as 38199) corresponding to the center frequency 2615 MHz of the downlink carrier and the f_offset parameter (−400).

Further, EARFCN of the UL_CarrierFreq can be directly added into the broadcast information. In the application shown in FIG. 8, the value of the UL_CarrierFreq is 37799.

Fourth Embodiment

Figure 9:
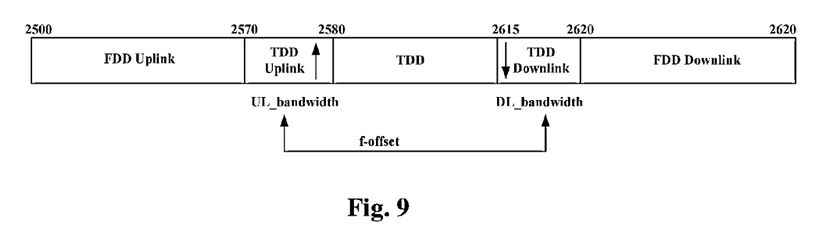
FIG. 9 is a schematic diagram of a time division duplex wireless communication system in which the band of the uplink is asymmetrical with that of the downlink according to a fourth embodiment of the invention.

As shown in FIG. 9, in the time division duplex wireless communication system in which the band of the uplink is asymmetrical with that of the downlink, the working frequency of FDD is 2500-2570/2620-2690 MHz, the working frequency of TDD is 2570-2620 MHz, the 2570-2580/2615-2620 MHz can be used for the asymmetric time division duplex in pairs.

A new parameter f_offset is defined for indicating the spacing between the center frequencies of the uplink carrier and the downlink carrier in the MIB or SIB of the broadcast information. F_offset is 42.5 MHz, which is represented as −425.

Once reading the downlink and uplink bandwidths in the broadcast information, the UE reads the spacing between the center frequencies of the uplink carrier and the downlink carrier in the broadcast information: f_offset=−425, and the working frequency UL_CarrierFreq (37799) of the uplink can be determined as 2575 MHz according to the EARFCN (numbered as 38224) corresponding to the center frequency 2617.5 MHz of the downlink carrier and the f_offset parameter (−425).

Further, EARFCN of the UL_CarrierFreq can be directly added into the broadcast information. In the application shown in FIG. 9, the value of the UL_CarrierFreq is 37799.

Fifth Embodiment

Based on the same inventive conception, it is further provided with a user equipment according to the embodiment of the present invention, which is used to a time division duplex wireless communication system in which the band of the uplink is asymmetrical with that of the downlink. The user equipment includes:

an obtaining module adapted to obtain a parameter of uplink carrier information according to a message issued by a network side in broadcast manner or obtaining a parameter of uplink carrier information according to preset information.

The obtaining module can be divided into a first sub-module and a second sub-module. The first sub-module is adapted to receive the message from the network side, the second sub-module is adapted to perform the operation of obtaining the parameter of the uplink carrier information. In the further description of the obtaining module, the second sub-module is adapted to perform various operations of obtaining the parameter of the uplink carrier information.

In the embodiment of the invention, the obtaining module is adapted to obtain the parameter of the uplink carrier information carried in a message, if the parameter of uplink carrier information is carried in the message.

Specifically, the obtaining module is adapted to obtain the parameter of the uplink carrier information from preset information according to an identifier of uplink carrier information, if the identifier of the uplink carrier information is carried in a message issued by the network side in broadcast manner, in which the identifier of the uplink carrier information corresponds to the parameter of the uplink carrier information.

The parameter of the uplink carrier information is directly obtained from preset information, if neither the parameter of the uplink carrier information nor the identifier of the uplink carrier information is carried in the message issued by the network side in broadcast manner, in which the preset information includes the position information for determining the uplink carrier frequency and/or the bandwidth information for determining the uplink carrier bandwidth.

The preset information is directly set on the user equipment, or issued to the user equipment by the network side and stored into the user equipment.

In the embodiment of the invention, the uplink carrier information includes an uplink carrier frequency and/or an uplink carrier bandwidth. In the case that the identifier of the uplink carrier information is an identifier of the uplink carrier frequency, the identifier of the uplink carrier frequency indicates whether the center frequency of the uplink carrier is identical to that of the downlink carrier. In the case that the identifier of the uplink carrier information is an identifier of the uplink carrier bandwidth, the identifier of the uplink carrier bandwidth indicates whether the uplink carrier bandwidth is identical to the downlink carrier bandwidth.

Further, the parameter of the uplink carrier information include: a position parameter of the uplink carrier frequency and/or a bandwidth parameter of the uplink carrier frequency; the position parameter and/or bandwidth parameter of the uplink carrier frequency are configurable.

The position parameter of the uplink carrier frequency includes but not limited to: the center frequency of the uplink carrier frequency, the starting position and ending position of the uplink carrier frequency, or the spacing information between the positions of the uplink carrier frequency and the downlink carrier frequency. The spacing information between the positions of the uplink carrier frequency and the downlink carrier frequency includes: spacing between the edges of the uplink carrier bandwidth and the downlink carrier bandwidth, spacing between the center frequencies of the uplink carrier bandwidth and the downlink carrier bandwidth, spacing between the starting frequencies of the uplink carrier bandwidth and the downlink carrier bandwidth, or spacing between the ending frequencies of the uplink carrier bandwidth and the downlink carrier bandwidth; and the bandwidth parameter of the uplink carrier frequency include: a size of the uplink bandwidth.

The user equipment is applicable to the time division duplex wireless communication system in which the band of the uplink is asymmetrical with that of the downlink. The band corresponding to the uplink carrier frequency is one of the intersection bands occurred when TDD and FDD coexist in adjacent frequency band in the wireless communication system, the band corresponding to the downlink carrier frequency is another one of the intersection bands occurred when TDD and FDD coexist in adjacent frequency band in the wireless communication system; or the band corresponding to the uplink carrier frequency is one of the intersection bands occurred when TDD and FDD coexist in adjacent frequency band in the wireless communication system, the band corresponding to the downlink carrier frequency is one of the downlink bands of the wireless communication system; or the band corresponding to the uplink carrier frequency is one of the uplink bands of the wireless communication system, the band corresponding to the downlink carrier frequency is another one of the intersection bands occurred when TDD and FDD coexist in adjacent frequency band in the wireless communication system; or the band corresponding to the uplink carrier frequency is one of the intersection bands occurred when TDD and FDD coexist in adjacent frequency band in the wireless communication system and one of the uplink bands of the wireless communication system, the band corresponding to the downlink carrier frequency is another one of the intersection bands occurred when TDD and FDD coexist in adjacent frequency band in the wireless communication system; or the band corresponding to the uplink carrier frequency is one of the intersection bands occurred when TDD and FDD coexist in adjacent frequency band in the wireless communication system, the band corresponding to the downlink carrier frequency is one of the downlink bands of the wireless communication system and another one of the intersection bands occurred when TDD and FDD coexist in adjacent frequency band in the wireless communication system.

Individual modules of the device according to the invention can be integrated as a whole, and can also be separately deployed. The above modules can be integrated as one module, and can also be further divided into multiple sub-modules.

Sixth Embodiment

Based on the same inventive conception, it is further provided with a network-side equipment according to the embodiment of the present invention, which is used to a time division duplex wireless communication system in which the band of the uplink is asymmetrical with that of the downlink. The network-side equipment includes:

a sending module adapted to issue a parameter of uplink carrier information to a user equipment in broadcast manner or issuing an identifier of uplink carrier information to a user equipment in broadcast manner. The uplink carrier information includes uplink carrier frequency and/or uplink carrier bandwidth.

The sending module is further adapted to send to the user equipment a broadcast message which does not carry the parameter of the uplink carrier information and the identifier of the uplink carrier information. When receiving the broadcast message, the user equipment can obtain the parameter of the uplink carrier information directly from the preset information.

If the identifier of uplink carrier information is an identifier of the uplink carrier frequency, the identifier of the uplink carrier frequency indicates whether the center frequency of the uplink carrier is identical to that of the downlink carrier.

If the identifier of uplink carrier information is an identifier of the uplink carrier bandwidth, the identifier of the uplink carrier bandwidth indicates whether the uplink carrier bandwidth is identical to the downlink carrier bandwidth.

The parameter of uplink carrier information includes but not limited to: a position parameter of the uplink carrier frequency and/or a bandwidth parameter of the uplink carrier frequency which are configurable. The position parameter of the uplink carrier frequency includes: a center frequency of the uplink carrier frequency, starting position and ending position of the uplink carrier frequency, or spacing information between the positions of the uplink carrier frequency and the downlink carrier frequency. The spacing information between the positions of the uplink carrier frequency and the downlink carrier frequency includes: a spacing between the edges of the uplink carrier bandwidth and the downlink carrier bandwidth, a spacing between the center frequencies of the uplink carrier bandwidth and the downlink carrier bandwidth, a spacing between the starting frequencies of the uplink carrier bandwidth and the downlink carrier bandwidth, or a spacing between the ending frequencies of the uplink carrier bandwidth and the downlink carrier bandwidth. The bandwidth parameter of the uplink carrier frequency includes: a size of the uplink bandwidth.

The network-side equipment is applicable to the time division duplex wireless communication system in which the band of the uplink is asymmetrical with that of the downlink. The band corresponding to the uplink carrier frequency is one of the intersection bands occurred when TDD and FDD coexist in adjacent frequency band in the wireless communication system, the band corresponding to the downlink carrier frequency is another one of the intersection bands occurred when TDD and FDD coexist in adjacent frequency band in the wireless communication system; or the band corresponding to the uplink carrier frequency is one of the intersection bands occurred when TDD and FDD coexist in adjacent frequency band in the wireless communication system, the band corresponding to the downlink carrier frequency is one of the downlink bands of the wireless communication system; or the band corresponding to the uplink carrier frequency is one of the uplink bands of the wireless communication system, the band corresponding to the downlink carrier frequency is another one of the intersection bands occurred when TDD and FDD coexist in adjacent frequency band in the wireless communication system; or the band corresponding to the uplink carrier frequency is one of the intersection bands occurred when TDD and FDD coexist in adjacent frequency band in the wireless communication system, the band corresponding to the downlink carrier frequency is one of the intersection bands occurred when TDD and FDD coexist in adjacent frequency band in the wireless communication system and one of the uplink bands of the wireless communication system; or the band corresponding to the uplink carrier frequency is one of the intersection bands occurred when TDD and FDD coexist in adjacent frequency band in the wireless communication system and one of the uplink bands of the wireless communication system, the band corresponding to the downlink carrier frequency is one of the intersection bands occurred when TDD and FDD coexist in adjacent frequency band in the wireless communication system; or the band corresponding to the uplink carrier frequency is one of the intersection bands occurred when TDD and FDD coexist in adjacent frequency band in the wireless communication system and one of the uplink bands of the wireless communication system, the band corresponding to the downlink carrier frequency is one of the intersection bands occurred when TDD and FDD coexist in adjacent frequency band in the wireless communication system and one of the uplink bands of the wireless communication system.

Individual modules of the device according to the invention can be integrated as a whole, and can also be separately deployed. The above modules can be integrated as one module, and can also be further divided into multiple sub-modules.

It can be seen that in the technical solutions according to an individual embodiment of the invention, for the TDD system, the downlink bandwidth is 50 MHz, the uplink bandwidth is 40 MHz. In the existing system, the bandwidths of the uplink and downlink in the TDD system are equal, which is unable to support the normal work of the above system. According to the technical solutions according to an individual embodiment of the invention, the uplink carrier bandwidth information is issued in the broadcast information, the information parameter is configurable, which is equal or unequal to the downlink bandwidth, the user equipment set the uplink carrier bandwidth according to the above information, so as to effectively support the work of the system.

With the description of the above embodiments, it can be clearly learn by those skilled that the present invention can be implemented by hardware, and can also be implemented by software tighter with necessary hardware platform. Based on this understanding, the technical solution according to the invention can be embodied in the form of software productions which software production can be stored in a non-volatile storage medium (such as CD-ROM, U disk, or mobile hard disk), including several instructions, for enabling a computing device (such as a personal computer, a server, or a network equipment) perform the methods according to individual embodiments of the invention.

It can be understood by those skilled in the art that the figures are only schematic diagrams of the preferred embodiment, the module or flow in the figure are not necessary for implementing the invention.

It can be understood by those skilled in the art that the modules in the device according to the embodiment can be distributed in the device according to the embodiment in accordance with the description in the embodiment, and can also be correspondingly varied to be located in one or more device different from that of the embodiment of the invention. The above modules of the embodiment can be combined into one module, and can also be further divided into multiple sub-modules.

The above numbers in the invention are only for description, but not represent the advantage or disadvantage of the invention.

The disclosed above are only several specific embodiments of the present invention, however, the present invention is not limited to this, any variation that can be made by those skilled in the art falls within the scope of protection of the present invention.

The invention claimed is:
1. A method for obtaining carrier information by user equipment, which is used to a time division duplex, TDD, wireless communication system in which a band of an uplink is asymmetrical with that of a downlink, the method comprising:

obtaining, by the user equipment, a parameter of uplink carrier information according to preset information;

wherein the obtaining, the user equipment the parameter of the uplink carrier information according to the preset information, comprises:

obtaining, by the user equipment, the parameter of the uplink carrier information from the reset information according to an identifier of the uplink carrier information, if the identifier of the uplink carrier information is carried in a message by the network side in broadcast manner, wherein the identifier of the uplink carrier information corresponds to the parameter of the uplink carrier information; and obtaining, by the user equipment, the parameter of the uplink carrier information directly from the preset information, if neither the parameter of the uplink carrier information nor he identifier of the uplink carrier information is carried in the message issued by the network side in broadcast manner, wherein the preset information comprises position information for determining an uplink carrier frequency and/or bandwidth information for determining an uplink carrier bandwidth.

2. The method according to claim 1, wherein the preset information is directly set on the user equipment, or issued to the user equipment by the network side and stored into the user equipment.

3. The method according to claim 1, wherein the uplink carrier information comprises the uplink carrier frequency and/or the uplink carrier bandwidth;

if the identifier of the uplink carrier information is an identifier of the uplink carrier frequency, the identifier of the uplink carrier frequency indicates whether a center frequency of the uplink carrier is identical to a center frequency of a downlink carrier; and if the identifier of the uplink carrier information is an identifier of the uplink carrier bandwidth, the identifier of the uplink carrier bandwidth indicates whether the uplink carrier bandwidth is identical to a downlink carrier bandwidth.

4. The method according to claim 1, wherein the uplink carrier information comprises an uplink carrier frequency and/or an uplink carrier bandwidth; wherein the parameter of the uplink carrier information comprises a position parameter of the uplink carrier frequency and/or a bandwidth parameter of the uplink carrier frequency; and wherein the position parameter and/or bandwidth parameter of the uplink carrier frequency are configurable.

5. The method according to claim 4, wherein the position parameter of the uplink carrier frequency comprises: a center frequency of the uplink carrier frequency, a starting position and an ending position of the uplink carrier frequency, or spacing information between a position of the uplink carrier frequency and a position of a downlink carrier frequency; and the spacing information between the position of the uplink carrier frequency and the position of the downlink carrier frequency comprises: a spacing between an edge of the uplink carrier bandwidth and an edge of a downlink carrier bandwidth, a spacing between a center frequency of the uplink carrier bandwidth and a center frequency of the downlink carrier bandwidth, a spacing between a starting frequency of the uplink carrier bandwidth and a starting frequency of the downlink carrier bandwidth, or a spacing between an ending frequency of the uplink carrier bandwidth and an ending frequency of the downlink carrier bandwidth.

6. The method according to claim 4, wherein the bandwidth parameter of the uplink carrier frequency comprises a size of the uplink bandwidth.

7. The method according to claim 1, wherein in a time division duplex wireless communication system in which the band of the uplink is asymmetrical with that of the downlink, the band corresponding to the uplink carrier frequency is one of intersection bands occurred when TDD and Frequency Division Duplex, FDD, coexist in adjacent frequency band in the wireless communication system, the band corresponding to a downlink carrier frequency is another one of the intersection bands occurred when TDD and FDD coexist in adjacent frequency band in the wireless communication system;

the band corresponding to the uplink carrier frequency is one of the intersection bands occurred when TDD and FDD coexist in adjacent frequency band in the wireless communication system, the band corresponding to the downlink carrier frequency is one of downlink bands of the wireless communication system;

the band corresponding to the uplink carrier frequency is one of the uplink bands of the wireless communication system, the band corresponding to the downlink carrier frequency is another one of the intersection bands occurred when TDD and FDD coexist in adjacent frequency band in the wireless communication system;

the band corresponding to the uplink carrier frequency is one of the intersection bands occurred when TDD and FDD coexist in adjacent frequency band in the wireless communication system, the band corresponding to the downlink carrier frequency is one of the intersection bands occurred when TDD and FDD coexist in adjacent frequency band in the wireless communication system and one of the uplink bands of the wireless communication system;

the band corresponding to the uplink carrier frequency is one of the intersection bands occurred when TDD and FDD coexist in adjacent frequency band in the wireless communication system and one of the uplink bands of the wireless communication system, the band corresponding to the downlink carrier frequency is one of the intersection bands occurred when TDD and FDD coexist in adjacent frequency band in the wireless communication system; or the band corresponding to the uplink carrier frequency is one of the intersection bands occurred when TDD and FDD coexist in adjacent frequency band in the wireless communication system and one of the uplink bands of the wireless communication system, the band corresponding to the downlink carrier frequency is one of the intersection bands occurred when TDD and FDD coexist in adjacent frequency band in the wireless communication system and one of the uplink bands of the wireless communication system.

8. A method for indicating carrier information, which is used to a time division duplex, TDD, wireless communication system in which a band of an uplink is asymmetrical with that of a downlink, the method comprising:

issuing, by a network-side equipment, a parameter of uplink carrier information to a user equipment in broadcast manner; or issuing, by a network-side equipment, an identifier of uplink carrier information to a user equipment in broadcast manner;

wherein the uplink carrier information comprises an uplink carrier frequency and/or an uplink carrier bandwidth; wherein the parameter of the uplink carrier information comprises a position parameter of the uplink carrier frequency; and/or a bandwidth parameter of the uplink carrier frequency and wherein the position parameter and/or bandwidth parameter of the uplink carrier frequency are configurable.

9. The method according to claim 8, wherein the uplink carrier information comprises an uplink carrier frequency and/or an uplink carrier bandwidth;
if the identifier of the uplink carrier information is an identifier of the uplink carrier frequency, the identifier of the uplink carrier frequency indicates whether a center frequency of the uplink carrier is identical to a center frequency of a downlink carrier; and
if the identifier of the uplink carrier information is an identifier of the uplink carrier bandwidth, the identifier of the uplink carrier bandwidth indicates whether the uplink carrier bandwidth is identical to a downlink carrier bandwidth.

10. The method according to claim 8, wherein the position parameter of the uplink carrier frequency comprises: a center frequency of the uplink carrier frequency, a starting position and an ending position of the uplink carrier frequency, or a spacing information between a position of the uplink carrier frequency and a position of a downlink carrier frequency; and
the spacing information between the position of the uplink carrier frequency and the position of the downlink carrier frequency comprises: a spacing between an edge of the uplink carrier bandwidth and an edge of a downlink carrier bandwidth, a spacing between a center frequency of the uplink carrier bandwidth and a center frequency of the downlink carrier bandwidth, a spacing between a starting frequency of the uplink carrier bandwidth and a starting frequency of the downlink carrier bandwidth, or a spacing between an ending frequency of the uplink carrier bandwidth and an ending frequency of the downlink carrier bandwidth.

11. The method according to claim 8, wherein the bandwidth parameter of the uplink carrier frequency comprises a size of the uplink bandwidth.

12. The method according to claim 8, wherein in a time division duplex wireless communication system in which the band of the uplink is asymmetrical with that of the downlink,
the band corresponding to the uplink carrier frequency is one of intersection bands occurred when TDD and Frequency Division Duplex, FDD, coexist in adjacent frequency band in the wireless communication system, the band corresponding to a downlink carrier frequency is another one of the intersection bands occurred when TDD and FDD coexist in adjacent frequency band in the wireless communication system;
the band corresponding to the uplink carrier frequency is one of the intersection bands occurred when TDD and FDD coexist in adjacent frequency band in the wireless communication system, the band corresponding to the downlink carrier frequency is one of downlink bands of the wireless communication system;
the band corresponding to the uplink carrier frequency is one of the uplink bands of the wireless communication system, the band corresponding to the downlink carrier frequency is another one of the intersection bands occurred when TDD and FDD coexist in adjacent frequency band in the wireless communication system;
the band corresponding to the uplink carrier frequency is one of the intersection bands occurred when TDD and FDD coexist in adjacent frequency band in the wireless communication system, the band corresponding to the downlink carrier frequency is one of the intersection bands occurred when TDD and FDD coexist in adjacent frequency band in the wireless communication system and one of the uplink bands of the wireless communication system;
the band corresponding to the uplink carrier frequency is one of the intersection bands occurred when TDD and FDD coexist in adjacent frequency band in the wireless communication system and one of the uplink bands of the wireless communication system, the band corresponding to the downlink carrier frequency is one of the intersection bands occurred when TDD and FDD coexist in adjacent frequency band in the wireless communication system; or
the band corresponding to the uplink carrier frequency is one of the intersection bands occurred when TDD and FDD coexist in adjacent frequency band in the wireless communication system and one of the uplink bands of the wireless communication system, the band corresponding to the downlink carrier frequency is one of the intersection bands occurred when TDD and FDD coexist in adjacent frequency band in the wireless communication system and one of the uplink bands of the wireless communication system.

13. A user equipment, which is used to a time division duplex, TDD, wireless communication system in which a band of an uplink is asymmetrical with that of a downlink, the user equipment comprising a non-transient computer readable media, wherein the non-transient computer readable media stores:
an obtaining module adapted to obtain a parameter of uplink carrier information according to preset information,
wherein the obtaining module is adapted to obtain the parameter of the uplink carrier information from the preset information according to an identifier of the uplink carrier information, if the identifier of the uplink information is carried in a message issued by the network side in broadcast manner, herein the identifier of the uplink carrier information corresponds to the parameter of the uplink carrier information; and
to obtain the parameter of the uplink carrier information directly from the preset information, if neither the parameter of the uplink carrier information nor the identifier of the uplink carrier information is carried in the message issued by network side in broadcast manner wherein the preset information comprises position information for determining an uplink carrier frequency and/or bandwidth information for determining an uplink carrier bandwidth.

14. The user equipment according to claim 13, wherein the preset information is directly set on the user equipment, or issued to the user equipment by the network side and stored into the user equipment.

15. The user equipment according to claim 13, wherein the uplink carrier information comprises the uplink carrier frequency and/or the uplink carrier bandwidth;
if the identifier of the uplink carrier information is an identifier of the uplink carrier frequency, the identifier of the uplink carrier frequency indicates whether a center frequency of the uplink carrier is identical to a center frequency of a downlink carrier; and
if the identifier of the uplink carrier information is an identifier of the uplink carrier bandwidth, the identifier of the uplink carrier bandwidth indicates whether the uplink carrier bandwidth is identical to a downlink carrier bandwidth.

16. The user equipment according to claim 15, wherein the parameter of uplink carrier information comprises: a position parameter of the uplink carrier frequency and/or a bandwidth parameter of the uplink carrier frequency, wherein the position parameter and/or bandwidth parameter of the uplink carrier frequency are configurable;

the position parameter of the uplink carrier frequency comprises: a center frequency of the uplink carrier frequency, a starting position and an ending position of the uplink carrier frequency, or spacing information between a position of the uplink carrier frequency and a position of a downlink carrier frequency;

the spacing information between the position of the uplink carrier frequency and the position of the downlink carrier frequency comprises: a spacing between an edge of the uplink carrier bandwidth and an edge of the downlink carrier bandwidth, a spacing between a center frequency of the uplink carrier bandwidth and a center frequency of the downlink carrier bandwidth, a spacing between a starting frequency of the uplink carrier bandwidth and a starting frequency of the downlink carrier bandwidth, or a spacing between an ending frequency of the uplink carrier bandwidth and an ending frequency of the downlink carrier bandwidth; and the bandwidth parameter of the uplink carrier frequency comprises a size of the uplink bandwidth.

17. The user equipment according to claim 13, wherein in a time division duplex wireless communication system in which the band of the uplink is asymmetrical with that of the downlink, the band corresponding to the uplink carrier frequency is one of intersection bands occurred when TDD and Frequency Division Duplex, FDD, coexist in adjacent frequency band in the wireless communication system, the band corresponding to a downlink carrier frequency is another one of the intersection bands occurred when TDD and FDD coexist in adjacent frequency band in the wireless communication system;

the band corresponding to the uplink carrier frequency is one of the intersection bands occurred when TDD and FDD coexist in adjacent frequency band in the wireless communication system, the band corresponding to the downlink carrier frequency is one of downlink bands of the wireless communication system;

the band corresponding to the uplink carrier frequency is one of the uplink bands of the wireless communication system, the band corresponding to the downlink carrier frequency is another one of the intersection bands occurred when TDD and FDD coexist in adjacent frequency band in the wireless communication system;

the band corresponding to the uplink carrier frequency is one of the intersection bands occurred when TDD and FDD coexist in adjacent frequency band in the wireless communication system, the band corresponding to the downlink carrier frequency is one of the intersection bands occurred when TDD and FDD coexist in adjacent frequency band in the wireless communication system and one of the uplink bands of the wireless communication system;

the band corresponding to the uplink carrier frequency is one of the intersection bands occurred when TDD and FDD coexist in adjacent frequency band in the wireless communication system and one of the uplink bands of the wireless communication system, the band corresponding to the downlink carrier frequency is one of the intersection bands occurred when TDD and FDD coexist in adjacent frequency band in the wireless communication system; or the band corresponding to the uplink carrier frequency is one of the intersection bands occurred when TDD and FDD coexist in adjacent frequency band in the wireless communication system and one of the uplink bands of the wireless communication system, the band corresponding to the downlink carrier frequency is one of the intersection bands occurred when TDD and FDD coexist in adjacent frequency band in the wireless communication system and one of the uplink bands of the wireless communication system.

18. A network-side equipment, which is used to a time division duplex, TDD, wireless communication system in which a band of an uplink is asymmetrical with that of a downlink, the network-side equipment comprising a non-transient computer readable media, wherein the non-transient computer readable media stores:

a sending module adapted to issue a parameter of uplink carrier information to a user equipment in broadcast manner or issue an identifier of uplink carrier information to a user equipment in broadcast manners;

wherein the uplink carrier information comprises an uplink carrier frequency and/or an uplink carrier bandwidth; wherein the parameter of the uplink carrier information comprises of a position parameter of the uplink carries frequency and/or a bandwidth parameter of the uplink carrier frequency and wherein the position parameter and/or bandwidth parameter of the uplink carrier frequency are configurable.

19. The network-side equipment according to claim 18, wherein;

if the identifier of the uplink carrier information is an identifier of the uplink carrier frequency, the identifier of the uplink carrier frequency indicates whether a center frequency of the uplink carrier is identical to a center frequency of a downlink carrier; and if the identifier of the uplink carrier information is an identifier of the uplink carrier bandwidth, the identifier of the uplink carrier bandwidth indicates whether the uplink carrier bandwidth is identical to a downlink carrier bandwidth.

20. The network-side equipment according to claim 19, wherein the position parameter of the uplink carrier frequency comprises: a center frequency of the uplink carrier frequency, a starting position and an ending position of the uplink carrier frequency, or spacing information between a position of the uplink carrier frequency and a position of a downlink carrier frequency;

the spacing information between the position of the uplink carrier frequency and the position of the downlink carrier frequency comprises: a spacing between en edge of the uplink carrier bandwidth and en edge of the downlink carrier bandwidth, a spacing between a center frequency of the uplink carrier bandwidth and a center frequency of the downlink carrier bandwidth, a spacing between a starting frequency of the uplink carrier bandwidth and a starting frequency of the downlink carrier bandwidth, or a spacing between an ending frequency of the uplink carrier bandwidth and an ending frequency of the downlink carrier bandwidth; and the bandwidth parameter of the uplink carrier frequency comprises a size of the uplink bandwidth.

21. The network-side equipment according to claim 18, wherein in a time division duplex wireless communication system in which the band of the uplink is asymmetrical with that of the downlink, the band corresponding to the uplink carrier frequency is one of intersection bands occurred when TDD and Frequency Division Duplex, FDD coexist in adjacent frequency band in the wireless communication system, the band corresponding to a downlink carrier frequency is another one of the intersection bands occurred when TDD and FDD coexist in adjacent frequency band in the wireless communication system;

the band corresponding to the uplink carrier frequency is one of the intersection bands occurred when TDD and FDD coexist in adjacent frequency band in the wireless communication system, the band corresponding to the downlink carrier frequency is one of downlink bands of the wireless communication system;

the band corresponding to the uplink carrier frequency is one of the uplink bands of the wireless communication system, the band corresponding to the downlink carrier frequency is another one of the intersection bands occurred when TDD and FDD coexist in adjacent frequency band in the wireless communication system;

the band corresponding to the uplink carrier frequency is one of the intersection bands occurred when TDD and FDD coexist in adjacent frequency band in the wireless communication system, the band corresponding to the downlink carrier frequency is one of the intersection bands occurred when TDD and FDD coexist in adjacent frequency band in the wireless communication system and one of the uplink bands of the wireless communication system;

the band corresponding to the uplink carrier frequency is one of the intersection bands occurred when TDD and FDD coexist in adjacent frequency band in the wireless communication system and one of the uplink bands of the wireless communication system, the band corresponding to the downlink carrier frequency is one of the intersection bands occurred when TDD and FDD coexist in adjacent frequency band in the wireless communication system; or the band corresponding to the uplink carrier frequency is one of the intersection bands occurred when TDD and FDD coexist in adjacent frequency band in the wireless communication system and one of the uplink bands of the wireless communication system, the band corresponding to the downlink carrier frequency is one of the intersection bands occurred when TDD and FDD coexist in adjacent frequency band in the wireless communication system and one of the uplink bands of the wireless communication system.

* * * * *